(12) United States Patent
Hall

(10) Patent No.: US 9,376,953 B2
(45) Date of Patent: Jun. 28, 2016

(54) FORCED AIR BLOWER BYPASS SYSTEM

(71) Applicant: AAI Corporation, Hunt Valley, MD (US)

(72) Inventor: Brandon R. Hall, Stewartstown, PA (US)

(73) Assignee: AAI Corporation, Hunt Valley, MD (US)

( * ) Notice: Subject to any disclaimer, the term of this patent is extended or adjusted under 35 U.S.C. 154(b) by 0 days.

(21) Appl. No.: 14/314,087

(22) Filed: Jun. 25, 2014

(65) Prior Publication Data

US 2015/0377116 A1   Dec. 31, 2015

(51) Int. Cl.
*F01P 5/04* (2006.01)
*F01P 5/06* (2006.01)
*B64D 33/08* (2006.01)

(52) U.S. Cl.
CPC . *F01P 5/04* (2013.01); *B64D 33/08* (2013.01); *F01P 5/06* (2013.01); *F01P 2050/20* (2013.01)

(58) Field of Classification Search
CPC ........ B60K 11/00; F01P 5/02; F01P 2050/20; F01P 1/00; B60H 1/32; B60H 2001/3245
USPC .............. 123/41.49, 41.11, 41.56, 41.63
See application file for complete search history.

(56) References Cited

U.S. PATENT DOCUMENTS

| | | | |
|---|---|---|---|
| 1,691,593 A | 11/1928 | Tank et al. | |
| 2,702,533 A * | 2/1955 | Jantschke | F02B 33/00 123/195 R |
| 3,302,881 A * | 2/1967 | Laing | B60H 1/02 237/12.3 A |
| 3,393,668 A * | 7/1968 | Milgram | F01N 3/20 60/278 |
| 4,399,778 A * | 8/1983 | Ancheta | F02B 25/02 123/54.4 |
| 4,461,341 A * | 7/1984 | Morrison | F01P 1/00 165/125 |
| 5,390,694 A * | 2/1995 | Zimmerly | B08B 9/093 137/240 |
| 5,567,393 A * | 10/1996 | Muschelknautz | F01N 3/22 137/494 |
| 7,000,685 B2 | 2/2006 | Morishita et al. | |
| 7,308,869 B2 * | 12/2007 | Stone | F02B 61/04 123/19 |
| 7,690,333 B2 | 4/2010 | Otterstrom et al. | |
| 8,026,644 B2 | 9/2011 | Violett | |
| 8,061,971 B2 | 11/2011 | Roush et al. | |
| 8,123,460 B2 | 2/2012 | Collette | |
| 8,561,254 B2 * | 10/2013 | Roden | A47L 11/34 15/320 |
| 2003/0215339 A1* | 11/2003 | Grimmer | F04B 25/00 417/201 |

(Continued)

FOREIGN PATENT DOCUMENTS

AU   20110902586   6/2011
EP   0283578 A2   9/1988

(Continued)

OTHER PUBLICATIONS

International Search Report mailed Sep. 11, 2015, 10 pages.

*Primary Examiner* — Lindsay Low
*Assistant Examiner* — Long T Tran
(74) *Attorney, Agent, or Firm* — BainwoodHuang

(57) ABSTRACT

A cooling air bypass prevents premature failure of an engine in the event that cooling air from an external blower is somehow obstructed or shut off. The cooling air bypass includes a normally-closed valve in a wall of a conduit. During proper operation of the blower, the conduit conducts cooling air from the blower to the engine. If the blower malfunctions, however, such that airflow from the blower is impeded or stops, the valve opens to provide an auxiliary airflow path through the valve in the wall of the conduit and into the engine.

14 Claims, 5 Drawing Sheets

(56) References Cited

U.S. PATENT DOCUMENTS

2004/0060548 A1* 4/2004 Carroll .................. F02B 33/446
 123/564
2008/0257318 A1* 10/2008 Foerst .................... F02D 21/08
 123/568.21
2008/0264088 A1* 10/2008 Hirsch ............... B60H 1/00907
 62/236

FOREIGN PATENT DOCUMENTS

| KR | 100852423 | 8/2008 |
|----|-----------|--------|
| WO | 2009139685 A1 | 11/2009 |
| WO | 2013000036 A1 | 1/2013 |
| WO | 2015069467 A1 | 5/2015 |

* cited by examiner

FORCED AIR BLOWER BYPASS SYSTEM

OVERVIEW OF INVENTION

1. Technical Field

The present disclosure relates generally to engine cooling. In particular, the present disclosure relates to apparatus, systems and methods for cooling a rotary engine of an unmanned aerial vehicle in the event of a failure of the primary cooling blower.

2. Background

Many wankel or rotary engines used for propulsion of unmanned air vehicles (UAV) require airflow through the engine core for rotor cooling as well as distribution of lubricant. Without this airflow the engine quickly overheats which could lead to catastrophic engine failure. Airflow is caused by a pressure delta: air flows from high pressure regions to low pressure regions. In some small wankel engines, the pressure delta is small; the high pressure is provided by the ram air of forward motion of the UAV and the low pressure is provided by suction on the back side of the propeller as shown in FIG. 1. In this figure, a rotary engine 10 is driving a propeller 12 in the rotary direction of arrow 14. The propeller 12 provides the thrust necessary to move the UAV forward, which causes a cooling airflow over the engine.

In larger or more advanced wankel engines, rotor air cooling is provided by a belt driven fan. This allows for much higher pressure delta across the engine which provides higher airflow and thus better cooling and dispersion of lubricant. The schematic for belt driven fan cooling is shown below in FIG. 2. As shown in this figure, a rotary engine 10 is driving a propeller 12 in the direction of arrow 14. An air blower 16 is powered by the rotary engine 10 by a drive belt 20 which is connected between a pulley 22 on the rotary engine and a pulley 24 on the air blower 16. Cooling air is provided to the rotary engine through the blower outlet 18. Many larger UAVs currently employ this system. A major weakness of this set up however is that the drive belt 20 is prone to failure. In the event that drive belt 20 breaks or the blower otherwise fails, cooling air is unable to pass through the blower 16 and the engine 10 will overheat and fail, which may cause the UAV to crash.

Therefore, the forced cooling systems as shown in FIG. 2 require an improvement that will prevent the engine from overheating in the event the drive belt fails or the blower is otherwise not working properly

DETAILED DESCRIPTION OF INVENTION

Embodiments in accordance with the present disclosure are set forth in the following text to provide a thorough understanding and enabling description of a number of particular embodiments. In some instances, well-known structures or operations are not shown, or are not described in detail to avoid obscuring aspects of the inventive subject matter associated with the accompanying disclosure. For example, rotary engine use on UAVs is well known. They are also used on various ground and water vehicles. A person skilled in the art will understand, however, that the invention may have additional embodiments, or that the invention may be practiced without one or more of the specific details of the embodiments as shown and described.

Figure 3:
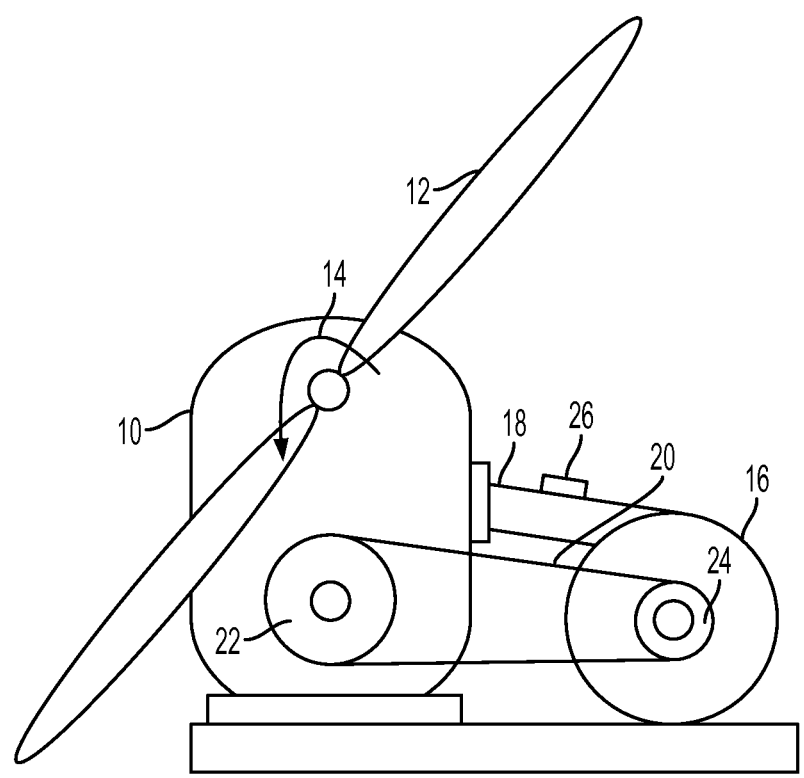
FIG. 3 is a simplified front plan view of an embodiment of the invention.

Referring to FIG. 3 where a rotary engine 10 with an air blower 16 is shown. Attached to the rotary engine 10 is a propeller 12 which is rotated in the direction of arrow 14 in order to provide aerodynamic thrust to move a vehicle like a UAV or the like. The air blower 16 is in fluid communication with the engine 10 through a blower outlet/conduit 18. The air blower 16 is configured to supply cooling air to the engine 10 to prevent the engine from overheating and pre-mature failure. The air blower 16 is driven by a drive belt 20 which is connected between a pulley 22 on the engine 10 and a pulley 24 located on the air blower 16. An air bypass 26 is disposed on the blower outlet 18.

Figure 4:
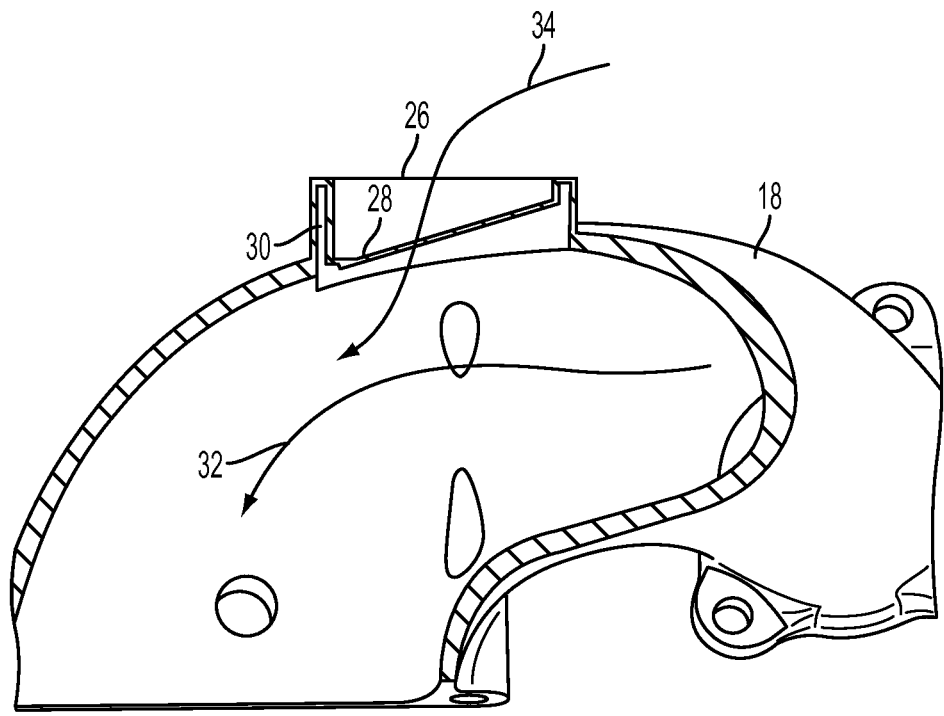
FIG. 4 is a partial cutaway view of the blower outlet in accordance with an embodiment of the invention.
Figure 5:
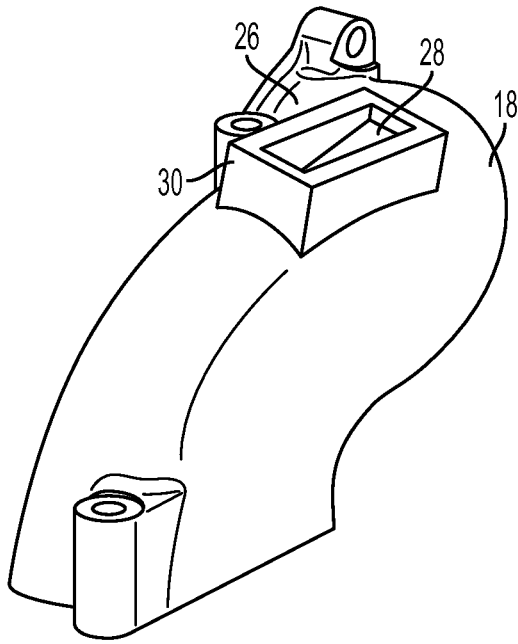
FIG. 5 is an isometric view of the blower outlet in accordance with an embodiment of the invention.

Referring now to FIGS. 4 and 5, which shows a close up view of the blower outlet 18. The air bypass 26 is comprised of a bypass housing 30 which is affixed to a wall of the outlet 18 and a sealing member 28 which is disposed inside of the housing 30. The sealing member 28 is configured to allow cooling air to enter the blower outlet 18 as shown by arrow 34 when the air blower 16 fails and cooling air as shown by arrow 32 is otherwise blocked. As shown in FIG. 4, the sealing member 28 is a reed type valve that will swing to an open position when the pressure on the outside of the blower outlet 18 is higher than the pressure internal to the blower outlet 18. While a reed valve is shown, many other types of check valves exist that can perform essentially the same function. These types of valves may include a ball check valve, a diaphragm check valve, a swing check valve and a lift-check valve. Using this arrangement, when cooling air is flowing in the path as shown by arrow 32, the sealing member 28 will remain sealed and not allow cooling air to flow in the path as shown by arrow 34. However, this arrangement will allow the sealing member 28 to open if the cooling air provided by the blower 18 is not occurring.

Figure 1:
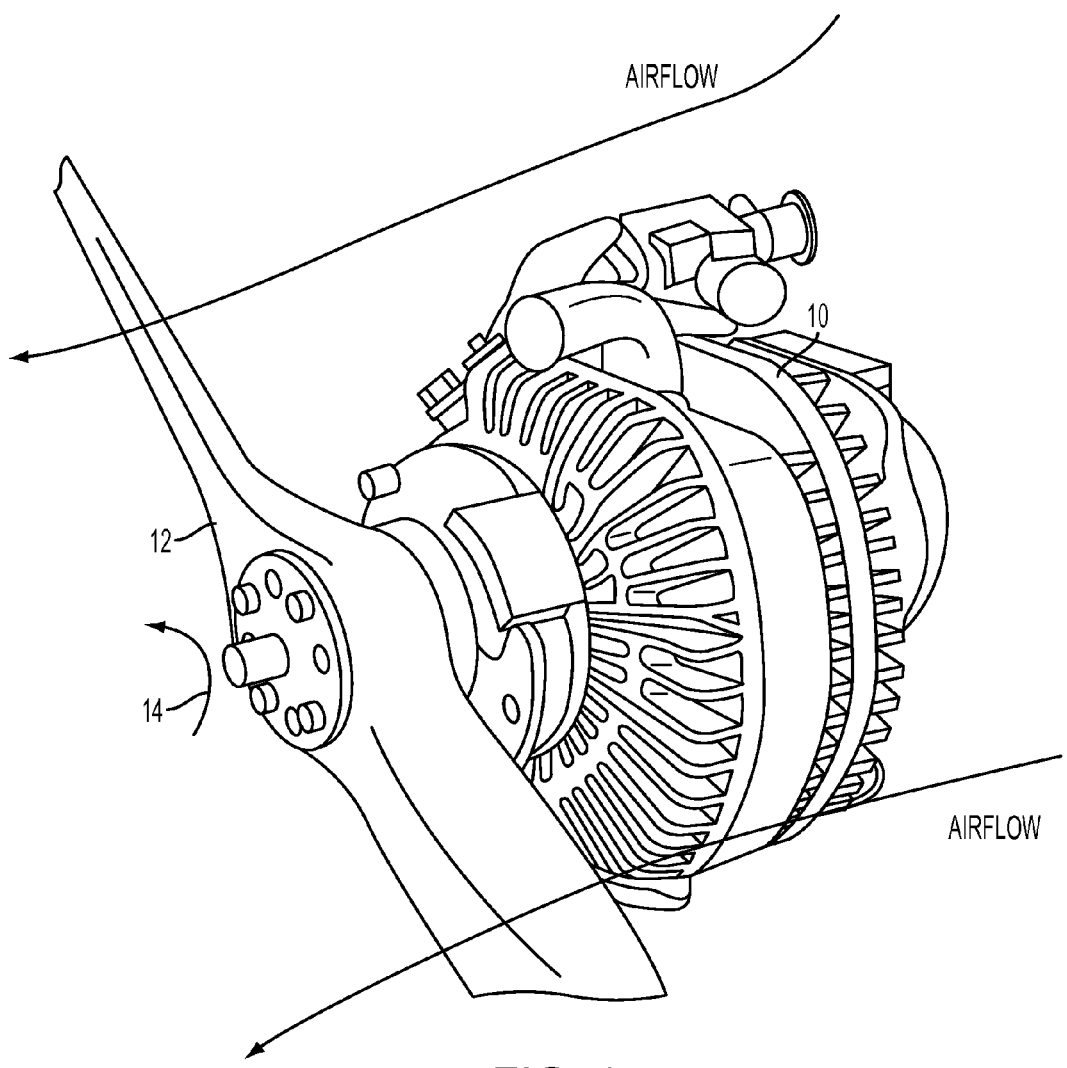
FIG. 1 is an isometric view of the prior art.
Figure 2:
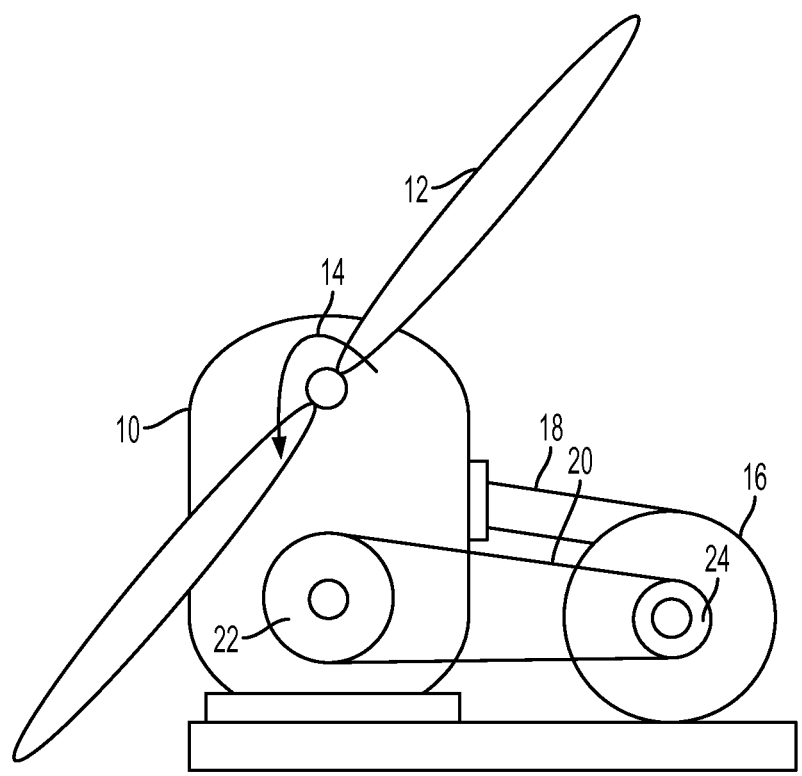
FIG. 2 is a simplified front plan view of the prior art.

In the event of a belt or blower failure, airflow from the blower 16 will stop. However, the low pressure caused by propeller 12 will cause a pressure differential across the engine 10 and air bypass 26, which will open the sealing member 28 and allow air to flow through the engine 10 to provide cooling and distribute lubricant. Although operation in this mode will reduce the performance of the engine, it will maintain similar performance as the configuration shown in FIG. 1 and this may prevent catastrophic failure of the engine and loss of the vehicle.

Figure 6:
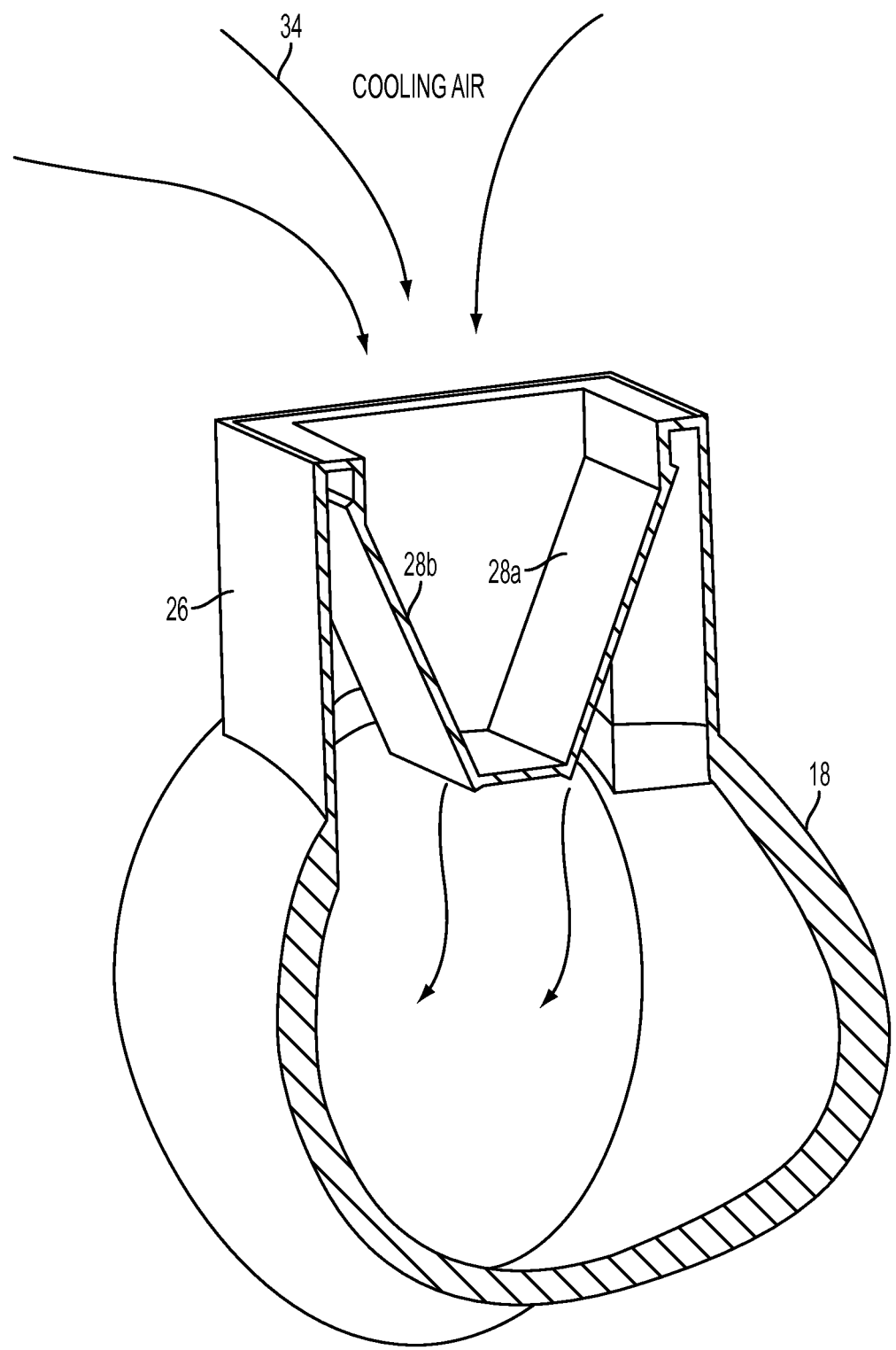
FIG. 6 is a partial cutaway view of the blower outlet in accordance with an embodiment of the invention.

Referring to FIG. 6 (where like numerals show like features), an alternative embodiment of the air bypass 26 is shown, which is comprised of a first sealing member 28a and a second sealing member 28b. This arrangement of two redundant sealing members may provide a more reliable air bypass feature.

The invention claimed is:

1. An engine with an air cooling system comprising:
   a blower configured to provide cooling air to the engine;
   a conduit configured to transfer the cooling air from the blower to the engine; and,
   a valve disposed between said blower and the engine, wherein said valve is normally closed while said blower is functioning properly and said valve is configured to open and allow cooling air to flow to the engine when said blower is not functioning properly, wherein said valve is disposed in a wall of the conduit, and wherein said valve, when configured to open and allow cooling air to flow to the engine, is configured to provide an airflow path through the wall of the conduit and to the engine when said blower is not functioning properly.

2. The engine of claim 1, further comprising:
a drive mechanism configured between the engine and said blower, said drive mechanism configured to provide power from the engine to said blower.

3. The engine of claim 2, wherein said drive mechanism further comprises a pulley disposed on the engine, a pulley disposed on said blower, and a drive belt connected between said pulleys.

4. The engine of claim 1, wherein said valve is one selected from the group consisting of a reed valve, a ball check valve, a diaphragm check valve, a swing check valve and a lift-check valve.

5. The engine of claim 1, wherein said valve is configured to open automatically when airflow from said blower is stopped.

6. The engine of claim 5, wherein said engine is coupled to a propeller to effect rotation of the propeller, and wherein said valve is configured to open in response to a pressure differential induced by rotation of the propeller when airflow from the blower is stopped.

7. The engine of claim 1, wherein the engine is constructed and arranged to receive cooling air from the blower when the valve is closed, and to receive cooling air through the valve when the valve is open.

8. An unmanned vehicle having an engine and an air cooling system, wherein the air cooling systems comprises:
a blower configured to provide cooling air to the engine;
a conduit configured to transfer the cooling air from the blower to the engine; and,
a valve disposed between said blower and the engine, wherein said valve is normally closed while said blower is functioning properly and said valve is configured to open and allow cooling air to the engine when said blower is not functioning properly, wherein said valve is disposed in a wall of the conduit, and wherein said valve, when configured to open and allow cooling air to flow to the engine, is configured to provide an airflow path through the wall of the conduit and to the engine when said blower is not functioning properly.

9. The unmanned vehicle of claim 8, further comprising:
a drive mechanism configured between the engine and said blower, said drive mechanism configured to provide power from the engine to said blower.

10. The unmanned vehicle of claim 9, wherein said drive mechanism further comprises a pulley disposed on the engine, a pulley disposed on said blower, and a drive belt connected between said pulleys.

11. The unmanned vehicle of claim 8, wherein said valve is one selected from the group consisting of a reed valve, a ball check valve, a diaphragm check valve, a swing check valve and a lift-check valve.

12. The unmanned vehicle of claim 8, where the unmanned vehicle is one selected from the group consisting of an aerial vehicle, a ground vehicle and a water vehicle.

13. An air cooling method for cooling an engine, the method comprising:
providing cooling air by a blower;
transferring the cooling air through a conduit from the blower to the engine; and
selectively opening a normally-closed valve disposed in a wall of the conduit to allow air to enter the conduit through the valve and to flow to the engine in response to the blower ceasing to provide cooling air to the conduit.

14. The method of claim 13, further comprising operating the engine to effect rotation of a propeller, the rotation of the propeller establishing a pressure differential that induces the valve to open when the blower ceases to provide cooling air to the conduit.

* * * * *